(12) United States Patent
Garbacea et al.

(10) Patent No.: US 11,257,507 B2
(45) Date of Patent: Feb. 22, 2022

(54) SPEECH CODING USING CONTENT LATENT EMBEDDING VECTORS AND SPEAKER LATENT EMBEDDING VECTORS

(71) Applicant: DeepMind Technologies Limited, London (GB)

(72) Inventors: Cristina Garbacea, Ann Arbor, MI (US); Aaron Gerard Antonius van den Oord, London (GB); Yazhe Li, London (GB); Sze Chie Lim, San Francisco, CA (US); Alejandro Luebs, San Francisco, CA (US); Oriol Vinyals, London (GB); Thomas Chadwick Walters, Bromley (GB)

(73) Assignee: DeepMind Technologies Limited, London (GB)

( * ) Notice: Subject to any disclaimer, the term of this patent is extended or adjusted under 35 U.S.C. 154(b) by 85 days.

(21) Appl. No.: 16/746,703

(22) Filed: Jan. 17, 2020

(65) Prior Publication Data

US 2020/0234725 A1 Jul. 23, 2020

Related U.S. Application Data

(60) Provisional application No. 62/793,806, filed on Jan. 17, 2019.

(51) Int. Cl.
*G10L 19/16* (2013.01)
*G10L 19/032* (2013.01)
*G10L 25/30* (2013.01)
*G06N 3/08* (2006.01)

(52) U.S. Cl.
CPC .............. *G10L 19/16* (2013.01); *G06N 3/08* (2013.01); *G10L 19/032* (2013.01); *G10L 25/30* (2013.01)

(58) Field of Classification Search
CPC ....... G10L 19/16; G10L 19/032; G10L 25/30; G10L 19/00; G10L 2019/0001; G06N 3/08; G06N 3/084; G06N 3/0454
See application file for complete search history.

(56) References Cited

U.S. PATENT DOCUMENTS

| | | |
|---|---|---|
| 2017/0011280 A1 * | 1/2017 | Soldevila ............. G06K 9/6214 |
| 2017/0069306 A1 * | 3/2017 | Asaei ....................... G10L 15/24 |
| 2018/0151177 A1 * | 5/2018 | Gemmeke ............ G10L 15/065 |
| 2019/0066713 A1 * | 2/2019 | Mesgarani ............. G10L 25/30 |

FOREIGN PATENT DOCUMENTS

WO WO 2018/224690 12/2018

OTHER PUBLICATIONS

Agustsson et al., "Soft-to-Hard Vector Quantization for End-to-End Learned Compression of Images and Neural Networks," https://arxiv.org/abs/1704.00648v1, Apr. 2017, 15 pages.

(Continued)

*Primary Examiner* — Michael N Opsasnick
(74) *Attorney, Agent, or Firm* — Fish & Richardson P.C.

(57) ABSTRACT

Methods, systems, and apparatus, including computer programs encoded on computer storage media, for generating discrete latent representations of input audio data. Only the discrete latent representation needs to be transmitted from an encoder system to a decoder system in order for the decoder system to be able to effectively to decode, i.e., reconstruct, the input audio data.

20 Claims, 5 Drawing Sheets

(56) References Cited

OTHER PUBLICATIONS

Balle et al., "End-to-end Optimized Image Compression," https://arxiv.org/abs/1611.01704v1, Nov. 2016, 24 pages.
Bessette et al., "The adaptive multirate wideband speech codec (AMR-WB)." IEEE Transactions on Speech and Audio Processing, Nov. 2002, 10(8):620-636.
Cernak et al., "Composition of Deep and Spiking Neural Networks for Very Low Bit Rate Speech Coding." IEEE/ACM Transactions on Audio, Speech, and Language Processing, Aug. 2016, 24(12):2301-2312.
Chen et al., "Sample Efficient Adaptive Text-to-Speech," https://arxiv.org/abs/1809.10460v1, Sep. 2018, 15 pages.
Garbacea et al., "Low Bit-rate Speech Coding with VQ-VAE and a WaveNet Decoder," ICASSP 2019—2019 IEEE International Conference on Acoustics, Speech and Signal Processing (ICASSP). May 2019, 735-739.
International Telecommunication Union, "Method for the subjective assessment of intermediate quality level of coding systems," ITU-R Recommendation BS. 1534-1,2001, 18 pages.
International Telecommunication Union, "Methods for subjective determination of transmission quality," ITU-T Recommendation p. 800, 1996, 37 pages.
International Telecommunication Union. "Pulse code modulation (PCM) of voice frequencies," ITU-T Recommendation G.711, 1988, 12 pages.
Jia et al., "Transfer Learning from Speaker Verification to Multispeaker Text-To-Speech Synthesis," https://arxiv.org/abs/1806.04558v1, Jun. 2018, 15 pages.
Kankanahalli, "End-To-End Optimized Speech Coding with Deep Neural Networks," 2018 IEEE International Conference on Acoustics, Speech and Signal Processing (ICASSP), Apr. 2018, 2521-2525.
Kingma et al.. "Auto-Encoding Variational Saves," https://arxiv.org/abs/1312.6114v1. Dec. 2013, 9 pages.
Kleijn et al., "Wavenet Based Low Rate Speech Coding," 2018 IEEE International Conference on Acoustics, Speech and Signal Processing (ICASSP), Apr. 2018, 676-680.
McCree et al., "A 2.4 kbit/s MELP coder candidate for the new U.S. Federal Standard," 1996 IEEE International Conference on Acoustics, Speech, and Signal Processing Conference Proceedings. May 1996, 200-203.
Mohammadi et al., "Investigation of Using Disentangled and Interpretable Representations for One-shot Cross-lingual Voice Conversion," https://arxiv.org/abs/1808.05294, Aug. 2018, 5 pages.
Panayotov et al., "Librispeech: An ASR corpus based on public domain audio books." 2015 IEEE International Conference on Acoustics, Speech and Signal Processing (ICASSP), Apr. 2015, 5206-5210.
PCT International Search Report, and Written Opinion in International Appln. No. PCT/EP2020/051150, dated Mar. 13, 2020, 20 pages.
Rippel et al., "Real-Time Adaptive Image Compression," https://arxiv.org/abs/1705.05823, May 2017, 16 pages.
Rowe, "Codec 2-Open source speech coding at 2400 bit/s and below," Tech. Rep., TAPR and ARRL 30th Digital Communications Conference, retrieved at URL <https://www.tapr.org/pdf/DCC2011-Codec2-VK5DGR.pdf>, Sep. 2011, 80-84.
Theis et al., "Lossy Image Compression with Compressive Autoencoders," https://arxiv.org/abs/1703.00395, Mar. 2017, 19 pages.
Valin, "Speex: A Free Codec For Free Speech," https://arxiv.org/abs/1602.08668, Feb. 2016, 8 pages.
Van den Oord et al.. "Neural Discrete Representation Learning," Advances in Neural Information Processing Systems 30. Nov. 2017, 10 pages.
Van den Oord et al., "WaveNet: A Generative Model for Raw Audio," ihttps://arxiv.org/abs/1609.03499v2, Sep. 2016, 15 pages.
Van Kuyk et al., "On the information rate of speech communication," 2017 IEEE International Conference on Acoustics, Speech and Signal Processing (ICASSP), Mar. 2017, 5625-5629.
International Preliminary Report on Patentability in International Appln. No. PCT/EP2020/051150, dated Jul. 29, 2021, 13 pages.

* cited by examiner

SPEECH CODING USING CONTENT LATENT EMBEDDING VECTORS AND SPEAKER LATENT EMBEDDING VECTORS

CROSS-REFERENCE TO RELATED APPLICATION

This application claims priority to U.S. Provisional Application No. 62/793,806, filed on Jan. 17, 2019. The disclosure of the prior application is considered part of and is incorporated by reference in the disclosure of this application.

BACKGROUND

This specification relates to speech coding using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as one or more computer programs on one or more computers in one or more locations that performs audio coding by generating a discrete latent representation of input audio data using an encoder neural network. The discrete latent representation is then used by a decoder system to decode the coded audio. Thus, only the discrete latent representation needs to be transmitted from an encoder system to the decoder system in order for the decoder system to be able to effectively to decode, i.e., reconstruct, the input audio data.

Generally, the discrete latent representation identifies a respective value for each latent variable in a sequence; the sequence may have a fixed number of latent variables. The latent representation is referred to as a discrete latent representation because, unlike a continuous representation, the value for each of the latent variables is selected from a discrete set of possible values. More specifically, the value for each of the latent variables is a vector selected from a discrete set of latent embedding vectors (also referred to as a "codebook") and the discrete latent representation only needs to include, for each latent variable in the sequence, an identifier for the corresponding vector from the codebook. This allows the discrete latent representation to be stored using very little storage space and transmitted from the encoder to the decoder using very little network bandwidth, i.e., because both the encoder and decoder have access to the same codebook.

Thus in one aspect there is described a system comprising a memory for storing a set of content latent embedding vectors, and optionally a set of speaker latent embedding vectors. One or more computers and one or more storage devices storing instructions that when executed by the one or more computers cause the one or more computers to implement an encoder neural network configured to receive input audio data, e.g., digitized speech data in the time and/or frequency domain, and process the input audio data to generate an encoder output that comprises a respective encoded vector corresponding to each latent variable in a sequence of latent variables (which defines a discrete latent representation). The one or more computers also implement a subsystem configured to: provide the input audio data as input to the encoder neural network to obtain the encoder output for the input audio data, and generate a discrete latent representation of the input audio data from the encoder output. The subsystem may generating the discrete latent representation by, for each of the latent variables in the sequence of latent variables, determining, from the set of content latent embedding vectors in the memory, a content latent embedding vector that is nearest to the encoded vector for the latent variable. Generating the discrete latent representation may also comprise generating a speaker vector from at least the encoded vectors in the encoder output, and determining, from the set of speaker latent embedding vectors in the memory, a speaker latent embedding vector that is nearest to the speaker vector.

Implementations of the system can provide high quality audio, e.g., speech, encoding at very low bit rates. In implementations including speaker latent embedding vectors in the memory, and generating a discrete latent representation which includes a speaker latent embedding vector generated for the sequence of latent variables, appears to improve the fidelity of reconstructed speech.

The discrete latent representation may include, for each of the latent variables (in the sequence), an identifier of the nearest latent embedding vector to the encoded vector for the latent variable and optionally an identifier of the speaker latent embedding vector that is nearest to the speaker vector. As well as being stored in the memory the latent embedding vectors may be stored or transmitted elsewhere e.g., for use by a remote decoder. In other implementations the discrete latent representation may include the nearest latent embedding vectors.

In implementations the encoder neural network is convolutional neural network. The convolutional neural network may have a dilated convolutional architecture e.g., only one of every n outputs from a previous layer may be connected to an input, or convolutional downsampling may be employed.

The one or more computers may also implement, locally or remotely, a decoder neural network. The decoder neural network may be configured to receive a decoder input derived from the discrete latent representation of the input audio data, and process the decoder input to generate a reconstruction of the input audio data. A or the subsystem may be further configured to generate the decoder input. The decoder input may comprise, for each of the latent variables (in the sequence), the content latent embedding vector that is nearest to the encoded vector for the latent variable in the encoder output, and optionally the speaker latent embedding vector that is nearest to the speaker vector. The subsystem may provide the decoder input as input to the decoder neural network to obtain the reconstruction of the input audio data.

In an aspect the decoder neural network and subsystem may be provided separately to the encoder neural network and subsystem, and may have access to (separate) memory storing the latent embedding vectors.

In implementations the decoder neural network is an auto-regressive convolutional neural network that is configured to auto-regressively generate the reconstruction conditioned on the decoder input. The reconstruction of the audio input data may be a predicted companded and quantized representation of the audio input data.

In implementations generating the speaker vector from at least the encoded vectors in the encoder output uses multiple encoded vectors to generate the speaker vector. This can encourage the system to generate a speaker representation which is independent of the semantic content of the audio (which is encoded by the content latent embedding vectors). For example in some implementations generating the speaker vector comprises applying mean pooling over the encoder vectors. However there other approaches which may be used. In implementations the speaker latent embedding vector does not vary over time i.e., (unlike the content latent embedding vectors) it may be generated for the sequence of latent variables rather than for each of the latent variables in the sequence. In some implementations the input audio data is a portion of an utterance (e.g., a portion of speech), the input audio data is preceded in the utterance by one or more other portions, and generating the speaker vector comprises applying mean pooling over the encoder vectors for the input audio data and encoder vectors generated for the one or more other portions of the utterance.

There is also described a method of training the above-described encoder neural network and decoder neural network, and/or of updating the above-described latent embedding vectors. The method may comprise receiving a training audio input, and processing the training audio input through the encoder neural network in accordance with current values of the encoder network parameters of the encoder neural network to generate a training encoder output that comprises, for each of the one more latent variables (in the sequence), a respective training encoded vector. The method may further comprise selecting, for each latent variable and from a plurality of current content latent embedding vectors currently stored in the memory, a current latent embedding vector that is nearest to the training encoded vector for the latent variable. The method may further comprise generating a speaker vector, i.e., a training speaker vector, from at least the training encoded vectors (for each of the latent variables in the sequence).

The method may further comprise selecting, from a plurality of current content latent embedding vectors currently stored in the memory, a current content latent embedding vector that is nearest to the training speaker vector, and generating a training decoder input that includes the nearest current content latent embedding vectors and the nearest current speaker latent embedding vector. The method may further comprise processing the training decoder input through the decoder neural network in accordance with current values of the decoder network parameters of the decoder neural network to generate a training reconstruction of the training audio input, and determining a reconstruction update to the current values of the decoder network parameters and the encoder network parameters by determining a gradient with respect to the current values of the decoder network parameters and the encoder network parameters to optimize a reconstruction error between the training reconstruction and the training audio input. The method may further comprise updating the current content latent embedding vectors and, where used, the current speaker latent embedding vectors.

In implementations updating the current content latent embedding vectors and the current speaker latent embedding vectors may include, for each latent variable, determining an update to the nearest current content latent embedding vector for the latent variable by determining a gradient with respect to the nearest current latent embedding vector to minimize an error between the training encoded vector for the latent variable and the nearest current content latent embedding vector to the training encoded vector for the latent variable.

Also or instead updating the current content latent embedding vectors and the current speaker latent embedding vectors may include determining a respective commitment update to the current values of the encoder parameters by determining a gradient with respect to the current values of the encoder parameters to minimize a commitment loss, between the training encoded vector for the latent variable and the nearest current content latent embedding vector to the training encoded vector for the latent variable. The commitment loss may be configured to help the encoder neural network to commit to an embedding, e.g., by controlling growth of a volume of the embedding space. This is helpful because the embeddings do not train as fast as the encoder network parameters.

Also or instead updating the current content latent embedding vectors and the current speaker latent embedding vectors may involve determining an update to the nearest current speaker latent embedding vector for the latent variable by determining a gradient with respect to the nearest current speaker latent embedding vector to minimize an error between the training speaker vector and the nearest current speaker latent embedding vector.

Determining the gradient with respect to the current values of the encoder network parameters may comprises copying gradients from the decoder input to the encoder output without updating the current speaker latent embedding vectors or current content latent embedding vectors. This is one way of addressing backpropagation through the selection of nearest neighbor latent embedding vectors. Alternatively this may involve determining a subgradient through the operations of selecting the nearest current latent embedding vector, and using the subgradient to determine the gradient with respect to the current values of the encoder network parameters.

The training method may further comprise processing the training decoder input through a pitch reconstruction neural network in accordance with current values of pitch reconstruction network parameters of the pitch reconstruction neural network to generate a training reconstruction of a pitch track of the training audio input. The pitch track may be a measure of a pitch of the training audio input e.g., a measure of a fundamental frequency ($f_0$) of the training audio input. The method may also then comprise determining a pitch reconstruction update to the current values of the pitch reconstruction network parameters and the encoder network parameters by determining a gradient with respect to the current values of the pitch reconstruction network parameters and the encoder network parameters to optimize a reconstruction error between the training reconstruction of the pitch track and a ground truth pitch track of the training audio input. This can help the system to encode prosodic, i.e., pitch and timing, information in the audio input.

Particular embodiments of the subject matter described in this specification can be implemented so as to realize one or more of the following advantages. A system can effectively code audio while limiting the amount of data that needs to be transmitted over a network from the encoder to the decoder. More specifically, because the described techniques make use of discrete latent representations, the described techniques can be used to perform very low bit-rate speech coding with high reconstruction quality. The bit-rate can be further reduced by using a powerful decoder neural network to reconstruct the speech, i.e., by using an auto-regressive decoder neural network, e.g., a WaveNet (arXiv 1609: 03499). As an illustrative example, the described techniques can be used to code speech with a bit-rate of 1.6 kbps or lower with the coded speech able to be reconstructed with a quality that matches or exceeds that of conventional speech coders that code speech at much higher bit-rates. Thus, the described systems and techniques reduce the amount of data that needs to be transmitted from the encoder to the decoder relative to conventional approaches while still maintaining high reconstruction quality relative to the conventional approaches. By making use of a set of speaker latent embedding vectors when generating the discrete latent representation, the described techniques can code speech in a speaker-independent (speaker-agnostic) manner with minimal additional coding overhead. By making use of a pitch reconstruction neural network during training, the described techniques can generate reconstructed speech that matches the prosody, i.e., pitch and timing, of the utterance in the input audio.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
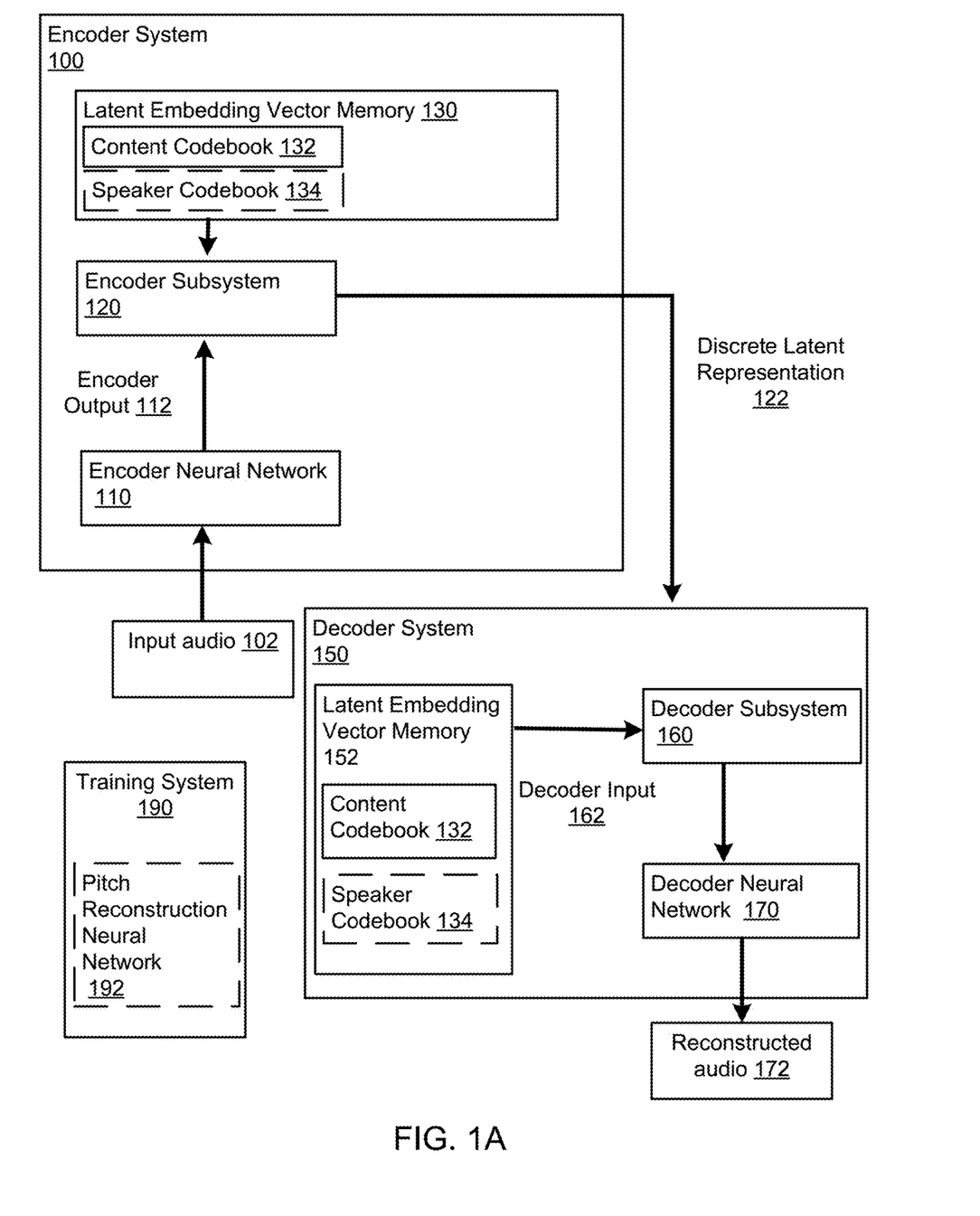
FIG. 1A shows an example encoder system and an example decoder system.

FIG. 1A shows an example encoder system 100 and an example decoder system 150. The encoder system 100 and decoder system 150 are examples of systems implemented as computer programs on one or more computers in one or more locations, in which the systems, components, and techniques described below can be implemented.

The encoder system 100 receives input audio data 102 and encodes the input audio data 102 to generate a discrete latent representation 122 of the input audio data 102. For example, the input audio data 102 can be a raw audio waveform of a fixed duration that includes a respective amplitude value corresponding to each of multiple times in a fixed time interval. The input audio data 102 will generally be recorded or streaming speech, i.e., audio of one or more people speaking in a natural language.

As will be described in more detail below, the latent representation 122 includes a numeric representation that identifies features of the input audio data 102 in a latent space. More specifically, the latent representation 122 identifies, for latent variable in a fixed size sequence of latent variables, a respective latent embedding vector in the latent space. The latent representation 122 is a discrete representation because each latent embedding vector is selected from a discrete set of latent embedding vectors.

The decoder system 150 receives the discrete latent representation 122 of the input audio data 102 (or a further compressed version of the discrete latent representation 122) and generates reconstructed audio data 172 that is a reconstruction of the input audio data 102. That is, the decoder system 150 generates an estimate of the input audio data 102 based on the discrete latent representation 122 of the input audio data 102. For example, the reconstruction can also include a raw amplitude value at each of the time points in the time interval. As another example, the audio value for each of the time points in the time interval can be a compressed or companded representation of the raw waveform at the corresponding time. As a particular example, the reconstruction can be a companded and quantized representation of the audio input data.

In particular, the encoder system 100 includes an encoder neural network 110, an encoder subsystem 120, and a latent embedding vector memory 130 that stores a set of content latent embedding vectors ("content codebook" 132) and, in some implementations, a set of speaker latent embedding vectors ("speaker codebook" 134). Both codebooks include a fixed number of vectors, but as will be described below, the vectors in both codebooks are adjusted through training.

The encoder neural network 110 is a neural network that has been configured through training to process the input audio data 102 to generate an encoder output 112 for the input audio data 102 in accordance with a set of parameters (referred to in this specification as "encoder network parameters").

The encoder output 112 is a sequence of encoded vectors, with each position in the sequence corresponding to a different latent variable.

The encoder neural network can have any appropriate architecture that allows the neural network to map audio data to a sequence of vectors. For example, the encoder neural network 110 can be a dilated convolutional neural network that receives the sequence of audio data and generates the sequence of encoded vectors.

Unlike a system that generates continuous latent representations and instead of using the encoder output as the representation of the input audio data 102, the encoder subsystem 120 generates the discrete latent representation 122 of the input audio data 102 using the encoder output 112 and the latent embedding vectors in the memory 130.

In particular, for each latent variable, the encoder subsystem 120 determines, from the content latent embedding vectors in the content codebook 132 in the memory 130, a content latent embedding vector that is nearest to the encoded vector for the latent variable. For example, the subsystem 120 can determine the content latent embedding vector that is nearest to a given encoded vector using a nearest neighbor lookup on the set of latent embedding vectors or any other appropriate distance metric.

In some cases, the subsystem 120 considers the entire set of content latent embedding vectors as possibilities for each of the content latent variables, i.e., selects the content latent embedding vector for each latent variable from the entire content codebook.

In some other cases, the content codebook is partitioned, with only the latent embedding vectors in the partition corresponding to a given latent variable being considered as potentially being the nearest latent embedding vector to the encoded vector for the given latent variable.

In implementations in which the system uses the speaker codebook 134, the encoder subsystem 120 generates, from the encoder output 112, a speaker vector from at least the encoded vectors in the encoder output and determines, from the set of speaker latent embedding vectors in the memory, a speaker latent embedding vector that is nearest to the speaker vector.

In particular, in some implementations, the input audio data is an entire utterance. In these implementations, the system generates the speaker vector only from the encoder output 112. For example, the system can apply mean pooling over the time dimension, i.e., over the encoded vectors in the encoder output, to generate the speaker vector.

In other implementations, the subsystem 120 is performing online audio coding and the current input audio is a portion of a larger utterance, i.e., the most recently received portion of the larger utterance. In these cases, the subsystem 120 can generate the speaker vector from the encoder output 112, i.e., from the encoded vectors for the current input audio 102, and from previous encoder outputs, i.e., from encoded vectors for one or more previous input audio portions of the utterance. As a particular example, the subsystem 120 can generate the speaker vector by performing mean pooling over the vectors in (i) the current encoder output and (ii) all previous encoder outputs for all previously received portions of the larger utterance. As another particular example, the subsystem 120 can generate the speaker vector by performing mean pooling over the vectors in (i) the current encoder output and (ii) all previous encoder outputs for previously received portions of the larger utterance that are within a threshold time window of the current audio input in the larger utterance.

The subsystem 120 then includes, in the discrete latent representation 122, data that identifies, for each latent variable, the nearest content latent embedding vector to the encoded vector for the latent variable and, when used, the nearest speaker latent embedding vector to the speaker vector.

By generating the speaker vector using global information, i.e., information from at least an entire portion of the input audio, that does not vary over time, the encoder neural network can use the time-varying set of codes, i.e., the individual content embedding vectors, to encode the message content which varies over time, while summarizing and passing speaker-related information through the separate non time-varying set of codes, i.e., the speaker latent embedding vectors. Furthermore, because in implementations the speaker latent embedding vector is only a single vector for the entire input audio 102, including the data identifying the speaker latent embedding vector in the latent representation 122 adds only a minimal amount of overhead, e.g., on the order of 1 to 2 bytes, to the total amount of data that needs to be signaled or stored in order for the decoder system 150 to reconstruct the audio data 102.

Generating a discrete latent representation is described in more detail below with reference to FIGS. 1B and 2.

In some implementations, the encoder system 100 and the decoder system 150 are implemented on the same set of one or more computers, e.g., when the discrete representation is being used to reduce the storage size of the audio data when stored locally by the set of one or more computers. In these implementations, the encoder system 120 stores the discrete latent representation 122 (or a further compressed version of the discrete latent representation 122) in a local memory accessible by the one or more computers so that the discrete latent representation (or the further compressed version of the discrete latent representation) can be accessed by the decoder system 150.

In some other implementations, the encoder system 100 and the decoder system 150 are remote from one another, i.e., are implemented on respective computers that are connected through a data communication network, e.g., a local area network, a wide area network, a mobile communications network, or a combination of networks. In these implementations, the discrete representation is being used to reduce the bandwidth required to transmit the input audio data 102 over the data communication network. In these implementations, the encoder system 120 provides the discrete latent representation 122 (or a further compressed version of the latent representation) to the decoder system 150 over the data communication network for use in reconstructing the input audio data 102.

The decoder system 150 includes a decoder subsystem 160 and a decoder neural network 170.

The decoder subsystem 160 is configured to receive the discrete latent representation 122 and generate a decoder input 162 using the latent embedding vectors in a latent embedding memory 152.

The latent embedding memory 152 generally stores the same latent embedding vectors as the latent embedding memory 130. That is, the latent embedding memory 152 includes the content codebook 132 and, in implementations in which the latent embedding memory 130 stores a speaker codebook 134, the speaker codebook 134.

When the encoder system 100 and decoder system 150 are implemented on the same set of computers, the memory 130 and the memory 152 can be the same memory. When the encoder system 100 and the decoder system 150 are remote from one another, the encoder system 100 can send the decoder system 150 the latent embedding vectors that are stored in the memory 130 prior to the decoder system 150 being used to reconstruct audio data. That is, the set of latent variables only need to be sent from the encoder system 100 to the decoder system 150 once in order for the decoder system 150 to be able to reconstruct audio data.

The decoder input 162 includes, for each latent variable, the content latent embedding vector that is identified for the latent variable in the discrete latent representation 122. Because the decoder system 150 has access to the same latent embedding vectors as the encoder system 160, the discrete latent representation 122 does not need to include the latent embedding vectors themselves and instead includes identifiers for the latent embedding vectors that are known to, i.e., that can be resolved by, the decoder system 150.

The decoder neural network 170 has been trained to process the decoder input 162 to generate the reconstruction 172 of the input audio data 102 in accordance with a set of parameters (referred to in this specification as "decoder network parameters").

In some implementations, the decoder neural network 170 is the same type of neural network as the encoder neural network 110, but configured to generate a reconstruction from a decoder input rather than an encoder output (which is the same size as the decoder input) from an input audio data.

In some other implementations, the decoder neural network 170 is an auto-regressive neural network, e.g., a WaveNet or other auto-regressive convolutional neural network. Generally, an auto-regressive neural network is a neural network that generates outputs in an auto-regressive manner, i.e., generates the current output conditioned on the outputs that have already been generated.

In implementations where the speaker codebook 134 is used, the decoder input 162 that is processed by the decoder neural network 170 also includes the speaker latent embedding vector that was identified in the discrete latent representation 122. After training, by making the speaker a different speaker from a speaker of the input audio data, i.e., by modifying the speaker latent embedding vector to a different vector from the speaker codebook, the decoder system 150 can effectively perform speaker conversion, i.e., transferring the voice from one speaker to another without changing the contents of what is said.

Generating a reconstruction of input audio data from a discrete latent representation of the audio data is described in more detail below with reference to FIGS. 1B and 3.

In order for the decoder neural network to be able to generate high quality reconstructions from decoder inputs, a training system 190 trains the encoder neural network 110 and the decoder neural network 170 jointly to determine trained values of the encoder network parameters and the decoder network parameters while also adjusting the latent embedding vectors in the memory 130 (and 152) to allow the latent embedding vectors to effectively represent features of input audio data.

In some implementations, during this training, the system also trains a pitch reconstruction neural network 192 jointly with the encoder 110 and the decoder 170.

The pitch reconstruction neural network 192 is a neural network that is configured to generate a training reconstruction of a pitch track of received audio inputs conditioned on the same decoder input as the decoder 170. The pitch reconstruction neural network 192 can have the same architecture as the decoder neural network 170, but configured to generate a reconstruction of the f0 (pitch) track of the audio data instead of directly reconstructing the waveform. For example, the pitch reconstruction neural network 192 can be an auto-regressive convolutional neural network that is configured to auto-regressively generate the reconstruction of the pitch track conditioned on the decoder input.

By training the encoder 110 and the decoder 170 jointly with the pitch reconstruction neural network 192, the encoder 110 is encouraged to pass pitch and timing information through to the decoder 170, i.e., by representing pitch and timing information in the encoder outputs. Including the pitch reconstruction neural network 192 in the joint training can improve the quality of reconstructions generated by the decoder 170 after training, without increasing the size of the discrete latent representations.

This training is described in more detail below with reference to FIG. 4.

In some implementations, after this joint training, the system 100 can employ a more powerful decoder neural network than the networks that were used in the training to improve the performance of the system at inference time. For example, in some implementations, when the decoder neural network 170 used during training was not auto-regressive, at inference time the decoder uses an auto-regressive neural network as the decoder, e.g., a WaveNet. That is, in these implementations, after training of the encoder and decoder to determine the trained values and to determine the final set of latent embedding vectors, the training system 190 fits an auto-regressive decoder over the trained encoder and trained latents.

Figure 1B:
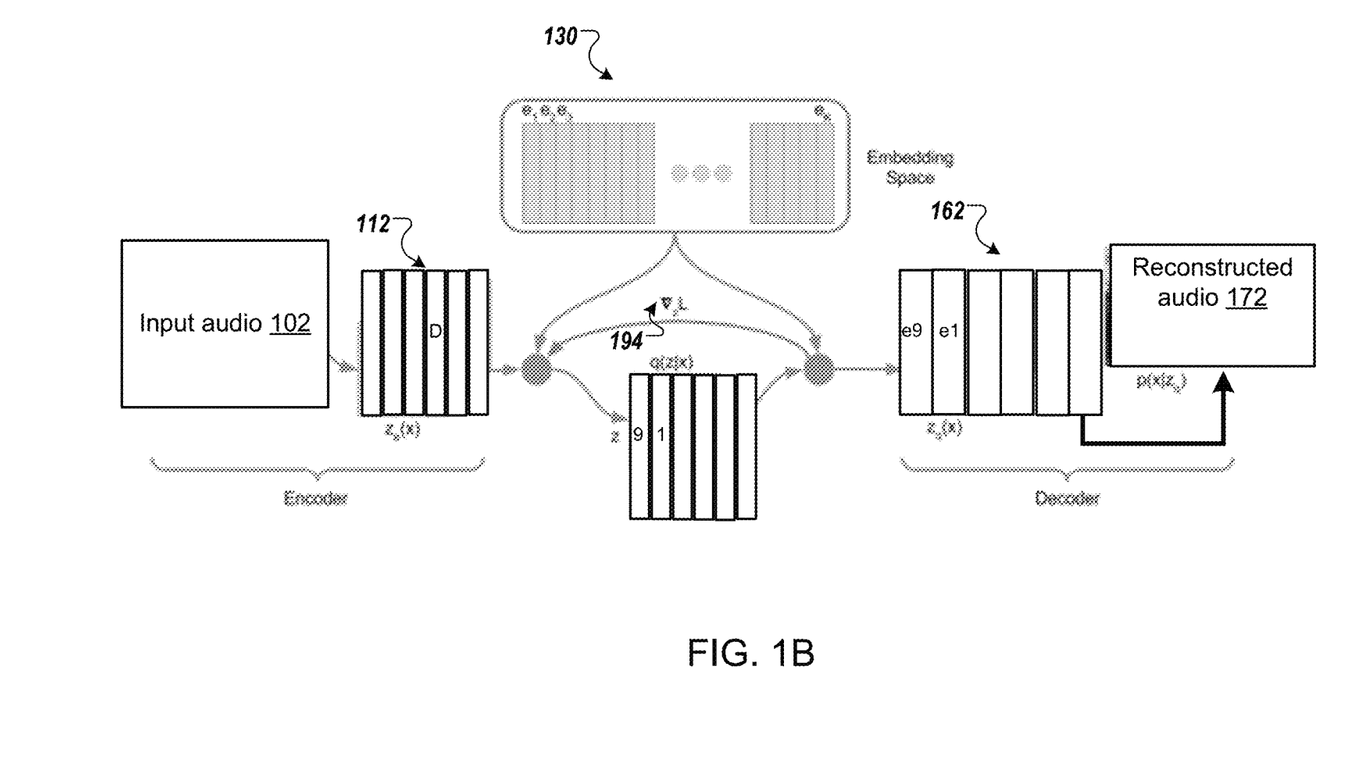
FIG. 1B illustrates an example of the operation of the encoder system and decoder system.

FIG. 1B illustrates an example of the operation of the systems 100 and 150.

In the example of FIG. 1B, the system 100 receives input audio data 102 and generates as output a reconstruction 172 of the audio data.

In particular, the encoder neural network 110 processes the audio data to generate the encoder output 112. As can be seen in FIG. 1B, the encoder output 112 is a sequence of D dimensional vectors, with each position in the sequence corresponding to a respective latent variable. Generally, each latent variable corresponds to a different time window within the input audio data. Thus, the encoder output 112 includes a respective encoded vector for each of multiple latent variables.

The system 100 then generates the discrete latent representation 122 using the encoder output 112 and the latent embedding vectors stored in the memory 130. In particular, in the example of FIG. 1B, the memory 130 stores a content codebook that includes K content latent embedding vectors $e_1$ through $e_K$.

To generate the latent representation 122, the system 100 identifies, for each of the latent variables, the latent embedding vector of the K content latent embedding vectors that is nearest to the encoded vector for the latent variable, e.g., using a nearest neighbor look-up. The system 100 then generates the latent representation 122 that identifies, for each of the latent variables, the nearest content latent embedding vector to the encoded vector for the latent variable. As can be seen in the example of FIG. 1B, for the latent variable corresponding to a first position in the sequence, the representation 122 identifies the content latent embedding vector $e_9$ while for the latent variable corresponding to a second position in the sequence the representation identifies the content latent embedding vector $e_1$, and so on.

The system 150 then generates the decoder input 162 using the latent embedding vectors and the latent representation 122.

In particular, the system 150 generates the decoder input 162 as a sequence of D dimensional vectors. The D dimensional vector at any given position in the sequence is the content latent embedding vector identified for the corresponding latent variable in the latent representation 122. Thus, the decoder input 162 includes the latent embedding vector $e_1$ at the first position, the latent embedding vector $e_9$ at the second position, and so on.

When the speaker codebook is being used, the system also generates a speaker vector from at least the encoder output 112 as described above and includes, in the latent representation 122, an identifier for the nearest speaker embedding vector to the speaker vector. The decoder input 162 then includes the nearest speaker embedding vector.

The system 150 processes the decoder input 162 using the decoder neural network 170 to generate the reconstruction 172 of the input audio data 102, i.e., an estimate of the input based on the latent representation 122.

When the example of FIG. 1B depicts a reconstruction generated during training of the encoder 110 and the decoder 150, the training system 190 needs to backpropagate gradients into the encoder to update the values of the encoder network parameters. As will be described in more detail below, the training system 190 can copy gradients 194 from the decoder input to the encoder output in order to allow for the encoder network parameters to be updated.

Figure 2:
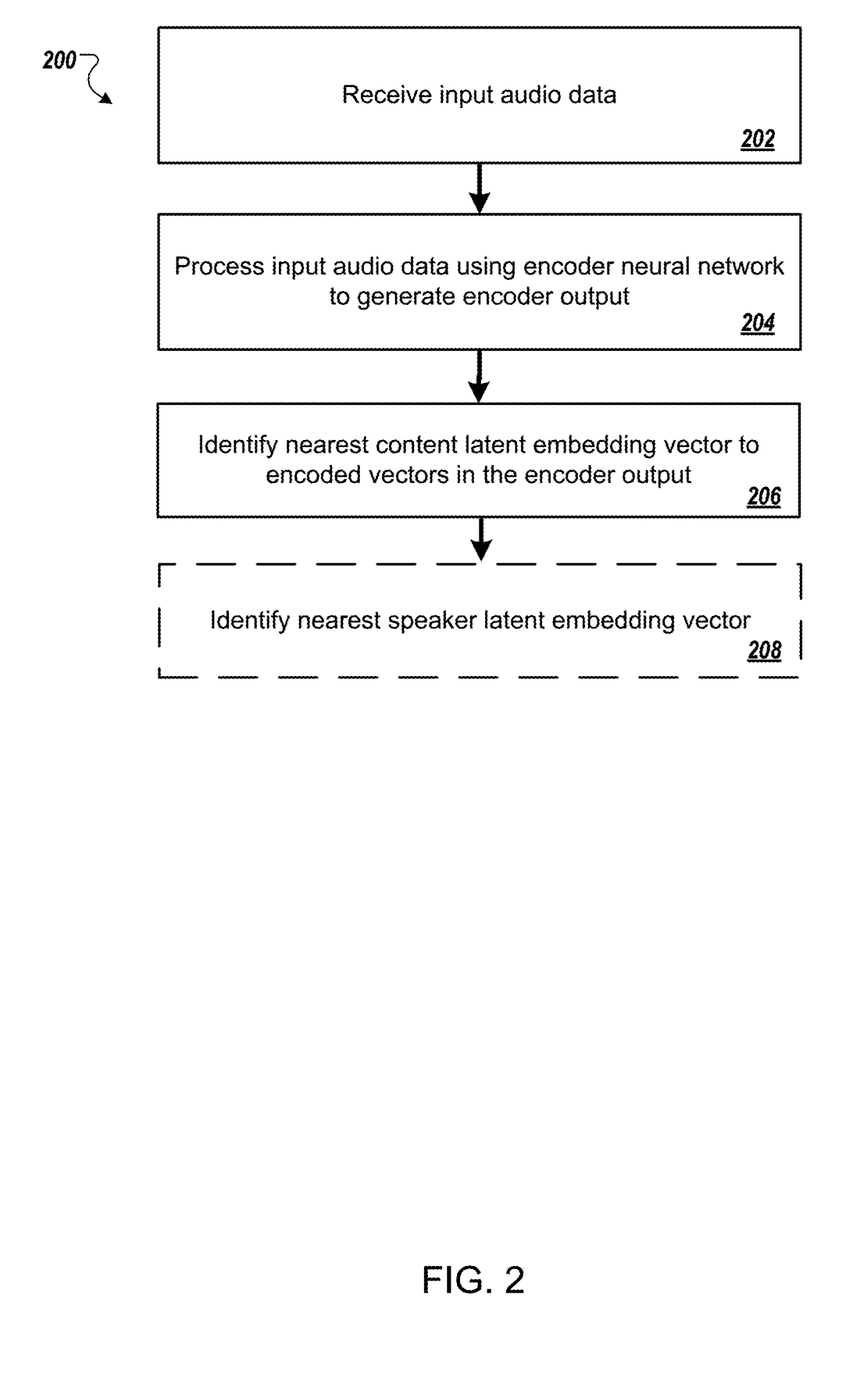
FIG. 2 is a flow diagram of an example process for generating a discrete latent representation of audio data.

FIG. 2 is a flow diagram of an example process 200 for generating a discrete latent representation of an input audio data. For convenience, the process 200 will be described as being performed by a system of one or more computers located in one or more locations. For example, an encoder system, e.g., the encoder system 100 of FIG. 1A, appropriately programmed, can perform the process 200.

The system receives input audio data (step 202).

The system processes the input audio data using an encoder neural network to generate an encoder output for the input audio data (step 204). In particular, as described above, the encoder neural network is configured to process the input audio data to generate an output that includes a respective encoded vector for latent variable in a sequence of latent variables.

The system generates a discrete latent representation of the input audio data using the encoder output.

In particular, for each latent variable, the system selects the content latent embedding vector stored in the latent embedding vector memory that is nearest to the encoded vector for the latent variable (step 206).

In some implementations, the system also generates a speaker vector and identifies the speaker latent embedding vector stored in the latent embedding vector memory that is nearest to the speaker vector (step 208). In particular, in some implementations, the input audio data is an entire utterance. In these implementations, the system generates the speaker vector only from the encoder output. For example, the system can apply mean pooling over the time dimension, i.e., over the encoded vectors in the encoder output, to generate the speaker vector.

In other implementations, the system is performing online audio coding and the current input audio is a portion of a larger utterance, i.e., the most recently received portion of the larger utterance. In these cases, the system can generate the speaker vector from the encoder output, i.e., from the encoded vectors for the current input audio, and from previous encoder outputs, i.e., from encoded vectors for one or more previous input audio portions of the utterance.

The system then generates a discrete latent representation that identifies, for each of the latent variables, the nearest content latent embedding vector to the encoded vector for the latent variable and, when used, the nearest speaker latent embedding vector to the speaker vector.

The discrete latent representation can identify a nearest content latent embedding vector in any of a variety of ways. For example, the latent representation can include, for each latent variable, a one-hot encoding of the nearest content latent embedding vector for the latent variable. As another example, the latent representation can be a single vector that includes, for each latent variable, an identifier for the nearest content latent embedding vector for the latent variable. Generally, the discrete latent representation can use any identifier that can be resolved by the decoder system.

The discrete latent representation can also identify the nearest speaker latent embedding vector using the same technique as is used to identify the nearest content latent embedding vectors.

In some implementations, the system further compresses the discrete latent representation, e.g., using arithmetic coding or another conventional data compression technique, before storing the discrete latent representation or transmitting the discrete latent representation to a decoder system. The decoder system also maintains the set of latent embedding vectors and an instance of the decoder neural network and can then reconstruct the audio data by generating a decoder input from the discrete latent representation and processing the decoder input using the decoder neural network.

Figure 3:
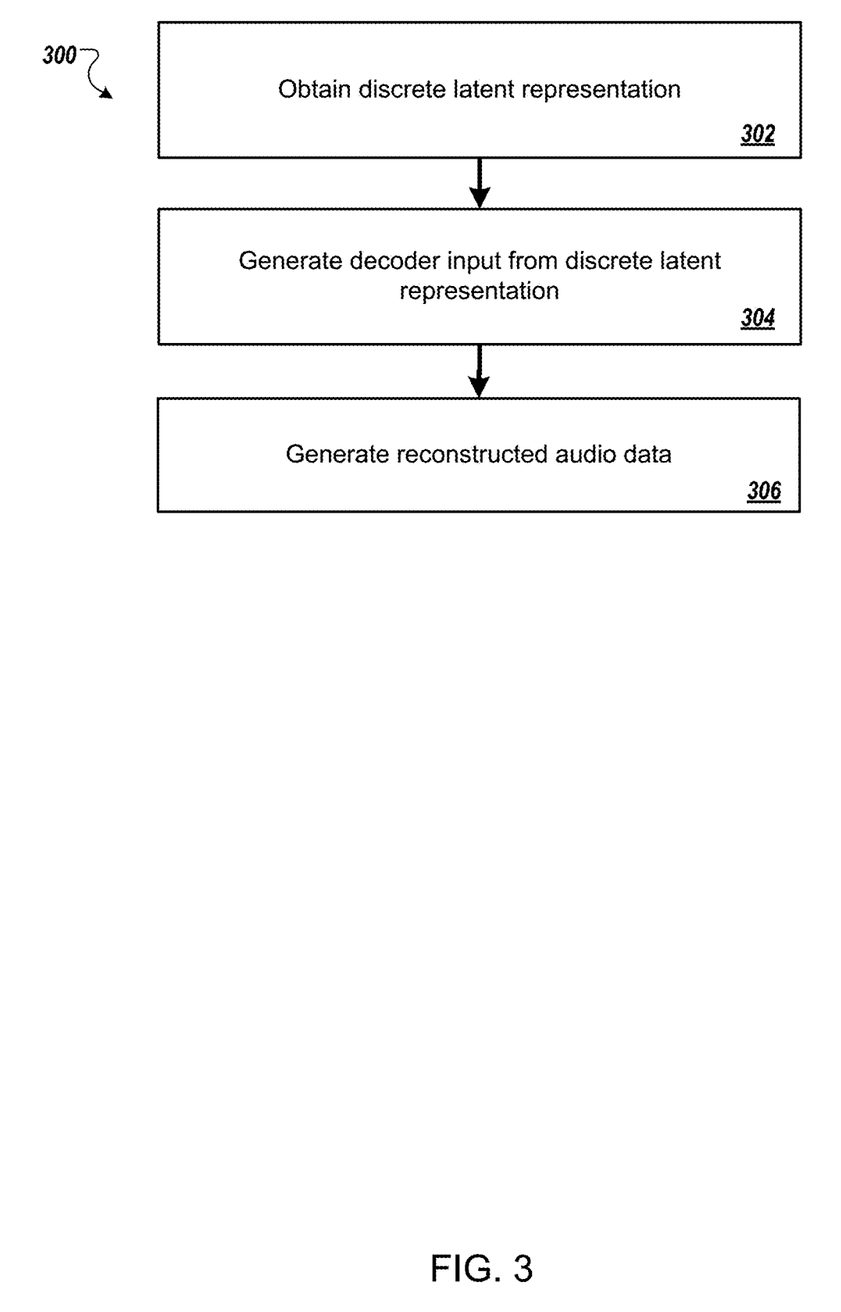
FIG. 3 is a flow diagram of an example process for generating a reconstruction of audio data from a discrete latent representation of the audio data.

FIG. 3 is a flow diagram of an example process 300 for generating a reconstruction of audio data from a discrete latent representation of the audio data. For convenience, the process 300 will be described as being performed by a system of one or more computers located in one or more locations. For example, a decoder system, e.g., the decoder system 150 of FIG. 1A, appropriately programmed, can perform the process 300.

The system obtains the discrete latent representation of the audio data (step 302). In some cases, the system directly accesses the discrete latent representation of the audio data, e.g., from memory or by receiving the discrete latent representation from an encoder system over a data communication system. In other cases, the system receives a further compressed version of the discrete latent representation and decompresses, e.g., using arithmetic decoding or another conventional technique that matches the technique used to compress the latent representation, the received version to obtain the discrete latent representation.

The system generates a decoder input from the discrete latent representation using the latent embedding vectors (step 304). In particular, the system generates a decoder input that includes, for each latent variable, the content latent embedding vector identified in the discrete latent representation for the latent variable. When the speaker codebook is used, the system also includes, in the decoder input, the speaker latent embedding vector that is identified in the discrete latent representation.

The system generates the reconstruction of the input audio data by processing the decoder input using the decoder neural network (step 306).

Figure 4:
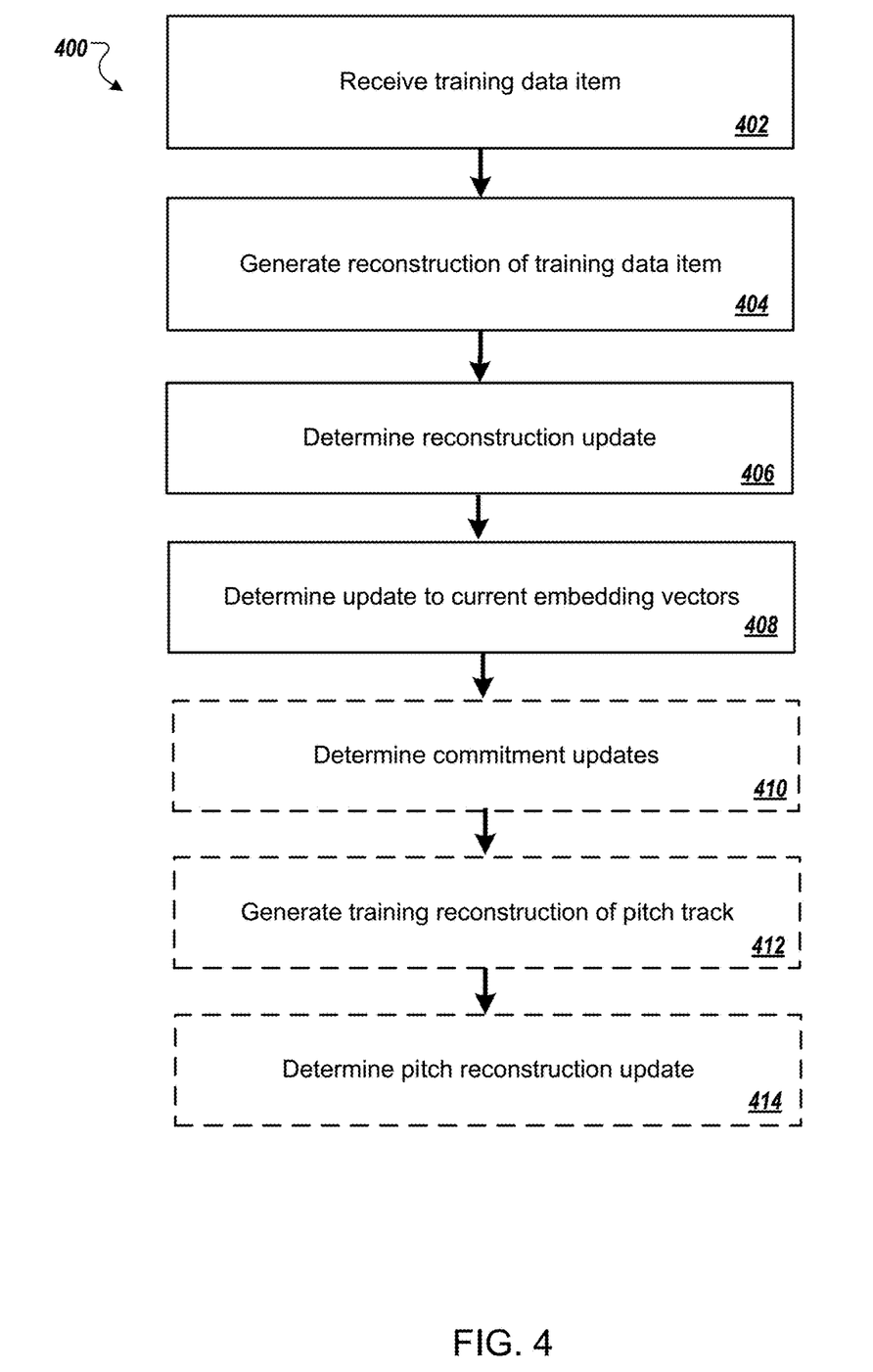
FIG. 4 is a flow diagram of an example process for determining an update to the encoder network parameters, the decoder network parameters, and the latent embedding vectors.

FIG. 4 is a flow diagram of an example process 400 for training the encoder neural network, the decoder neural network, and updating the latent embedding vectors. For convenience, the process 400 will be described as being performed by a system of one or more computers located in one or more locations. For example, a training system, e.g., the training system 190 of FIG. 1A, appropriately programmed, can perform the process 400.

The system can repeatedly perform the process 400 to repeatedly update the values of the encoder network parameters, the decoder network parameters, and the latent embedding vectors.

The system receives training audio data (step 402). For example, the training audio data can be audio data randomly sampled from a set of training data maintained by the system.

The system generates a training reconstruction of the training audio data using the encoder neural network in accordance with current values of the encoder network parameters, the current latent embedding vectors, i.e., the latent embedding vectors that are currently stored in the memory, and the decoder neural network in accordance with current values of the decoder network parameters (step 404).

In particular, the system processes the training audio data through the encoder neural network in accordance with current values of the encoder network parameters to generate a training encoder output that includes, for each of the one more latent variables, a respective training encoded vector.

The system then selects, for each latent variable and from the current content latent embedding vectors, a current content latent embedding vector that is nearest to the training encoded vector for the latent variable. In implementations where the speaker codebook is used, the system also generates a speaker vector and selects a current speaker latent embedding vector that is nearest to the speaker vector.

The system then generates a training decoder input that includes the nearest current content latent embedding vectors (and, when used, the nearest current speaker latent embedding vector) and processes the training decoder input through the decoder neural network in accordance with the current values of the decoder network parameters to generate the training reconstruction of the training audio data.

The system determines a reconstruction update to the current values of the decoder network parameters and the encoder network parameters (step 406).

In particular, the system determines the reconstruction updates by determining a gradient with respect to the current values of the decoder network parameters and the encoder network parameters of a reconstruction error between the training reconstruction and the training audio data, i.e., to optimize the reconstruction error.

In some implementations the reconstruction error is a reconstruction loss that satisfies:

$$L_r = \log p(x|z_q(x)),$$

where x is the input audio data, $z_q(x)$ is the decoder input, and $p(x|z_q(x))$ is the probability assigned to the input audio data by the decoder.

In order to determine the gradient of this reconstruction error with respect to the encoder network parameters, the system needs to backpropagate gradients into the encoder from the decoder. However, the operations of selecting the nearest current latent embedding vector and selecting the nearest current speaker latent embedding vector have no defined gradient.

In some implementations, to backpropagate into the encoder neural network in spite of this, the system copies gradients from the decoder input to the encoder output without updating the current speaker and content latent embedding vectors.

In some other implementations, the system determines a subgradient through the operation of selecting the nearest current latent embedding vector for each latent variable and uses the subgradient (and when used, the operation of selecting the nearest current speaker latent embedding vector) to determine the gradient with respect to the current values of the encoder network parameters.

By determining this update, the system encourages the encoder and decoder neural networks to generate higher quality reconstructions given the current latent embedding vectors, i.e., the latent embedding vectors currently stored in the memory.

The system determines updates to the current latent embedding vectors that are stored in the memory (step 408). The system can perform the below steps independently for both the speaker codebook and the content codebook, so that the encoder can use the two codebooks to signal different properties of the input audio, as described above.

In particular, in some implementations, for each latent variable, the system determines an update to the nearest current content latent embedding vector for the latent variable by determining a gradient with respect to the nearest current content latent embedding vector of an error between the training encoded vector for the latent variable and the nearest current latent embedding vector for the latent variable, i.e., to minimize the error.

For example, the error E for a given latent variable can satisfy:

$$\|sg[z_e(x)] - e\|_2^2,$$

where sg stands for the stopgradient operator that is defined as identity at forward computation time and has zero partial derivatives, thus effectively constraining its operand to be a non-updated constant, $z_e(x)$ is the encoded vector for the latent variable, and e is the nearest current content latent embedding vector for the latent variable.

Thus, the error is a constant, e.g., one or a different positive value, multiplied by the square of an l2 error between the stopgradient of the training encoded vector for the latent variable and the nearest current content latent embedding vector to the training encoded vector.

In some other implementations, the system can update the current content latent embedding vectors as a function of the moving averages of the encoded vectors in the training encoder outputs. That is, for each current content latent embedding vector, the system can update the embedding vector using exponential moving averages of the n encoded vectors that are nearest to the embedding vector.

For example, for a given embedding vector $e_i$, and at training time step t, the system can set the value as follows:

$$N_i^{(t)} := N_i^{(t-1)} * \gamma + n_i^{(t)}(1 - \gamma)$$

$$m_i^{(t)} := m_i^{(t-1)} * \gamma + \sum_j z_{i,j}^{(i)}(1 - \gamma)$$

$$e_i^{(t)} := \frac{m_i^{(t)}}{N_i^{(t)}},$$

where $\gamma$ is a fixed value between zero and one, $n_i^{(t)}$ is the number of nearest encoded vectors that are being used to update the value of the given embedding vector at the time step t, the sum is a sum over the $n_i^{(t)}$ nearest encoded vectors, and $z_{i,j}^{(t)}$ is the j-th nearest encoded vector to the given embedding vector at the time step t.

By updating the current content latent embedding vectors in this manner, the system moves at least some of the embedding vectors in the memory towards the encoded vectors in the encoder output.

The system can also update the speaker latent embedding vectors using either of these two approaches, i.e., either using moving averages of the speaker vectors or by determining a gradient with respect to the nearest current speaker latent embedding vector of an error between the speaker vector and the nearest current speaker latent embedding vector.

In some implementations, the system also determines, for each latent variable, a respective commitment update to the current values of the encoder network parameters (step 410). The system can determine the update for a given latent variable by determining a gradient with respect to the current values of the encoder network parameters of a commitment loss between the training encoded vector for the latent variable and the nearest content current latent embedding vector for the latent variable, i.e., to minimize the commitment loss.

For example, the commitment loss for a given latent variable can satisfy:

$$\beta \|z_e(x) - sg[e]\|_2^2,$$

where $\beta$ is a positive constant that determines the weight between the commitment loss updates and the reconstruction loss updates. For example, $\beta$ can be a value between 0.1 and 2.0.

Thus, the commitment loss is a constant multiplied by a square of an l2 error between the training encoded vector for the latent variable and the stopgradient of the nearest current latent embedding vector for the latent variable.

Including the commitment loss can ensure that the encoder neural network commits to an embedding and that the volume of the encoder outputs does not grow, preventing the volume of the embedding space from growing arbitrarily because the embeddings do not train as fast as the encoder network parameters.

The system can also optionally compute a commitment update using a commitment loss for the speaker vector using the same technique.

As described above, in some cases, the system trains the encoder and decoder jointly with a pitch reconstruction neural network.

In these cases, the system processes the training decoder input through the pitch reconstruction neural network in accordance with current values of the parameters of the neural network ("pitch reconstruction network parameters") to generate a training reconstruction of a pitch track of the training audio input (step 412).

The system then determines a pitch reconstruction update to the current values of the pitch reconstruction network parameters and the encoder network parameters by determining a gradient with respect to the current values of the pitch reconstruction network parameters and the encoder network parameters to optimize a reconstruction error between the training reconstruction of the pitch track and a ground truth pitch track of the training audio input, i.e., the actual pitch track of the training audio input (step 414).

As described above with respect to gradient of the reconstruction loss, the system can update the encoder network parameters by either (i) copying gradients of the reconstruction error from the reconstruction network input to the encoder output without updating the current speaker latent embedding vectors or current content latent embedding vectors or (ii) determining a subgradient through the operations of selecting the nearest current latent embedding vector and using the subgradient to determine the gradient with respect to the current values of the encoder network parameters.

Once the system has performed the process 400 for each training audio data in a mini-batch of training audio data, the system applies the updates to the current values of the encoder network parameters and the decoder network parameters and to the current embedding vectors, e.g., in accordance with the update rule employed by the optimizer used by the system in the training, e.g., the Adam optimizer or another gradient descent-based optimizer.

The system repeats the process 400 for multiple mini-batches to determine the trained encoder and decoder network parameter values and the final set of latent embedding vectors.

The architecture of the encoder and decoder neural networks, and the dimensions of the latent embedding vectors may be varied, for example according to the desired reconstruction quality and bit rate. However merely by way of example high quality speech reconstruction is possible at a bit rate of 1600 bps with five strided convolutional encoder layers of stride 2 and one of stride 5 (a total downsampling factor of 160 and a feature rate of 100 Hz), and 256-element speaker and content codebooks each coding a 64-dimensional latent vector.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising:
a memory for storing:
a set of content latent embedding vectors; and
a set of speaker latent embedding vectors;

one or more computers and one or more storage devices storing instructions that when executed by the one or more computers cause the one or more computers to implement:
　an encoder neural network configured to:
　　receive input audio data; and
　　process the input audio data to generate an encoder output that comprises a plurality of encoded vectors, each respective encoded vector of the plurality of encoded vectors corresponding to a respective different latent variable in a sequence of a plurality of latent variables; and
　a subsystem configured to:
　　provide the input audio data as input to the encoder neural network to obtain the encoder output for the input audio data that comprises the plurality of encoded vectors that each correspond to a respective different latent variable in the sequence of the plurality of latent variables; and
　　generate a discrete latent representation of the input audio data from the encoder output, comprising:
　　　for each of the latent variables in the sequence of latent variables, determining, from the set of content latent embedding vectors in the memory, a content latent embedding vector that is nearest to the encoded vector corresponding to the latent variable;
　　　generating a speaker vector by combining at least the plurality of encoded vectors in the encoder output generated by the encoder neural network into a single vector; and
　　　determining, from the set of speaker latent embedding vectors in the memory, a speaker latent embedding vector from the set of speaker latent embedding vectors stored in the memory that is nearest to the speaker vector that is generated by combining at least the plurality of encoded vectors in the encoder output generated by the encoder neural network into a single vector, wherein:
　the content latent embedding vectors in the set of content latent embedding vectors are learned during joint training of the encoder neural network and a decoder neural network; and
　the speaker latent embedding vectors in the set of speaker latent embedding vectors are learned during the joint training of the encoder neural network and the decoder neural network.

2. The system of claim 1, wherein the discrete latent representation of the input audio data includes (i) for each of the latent variables, an identifier of the nearest latent embedding vector to the encoded vector for the latent variable and (ii) an identifier of the speaker latent embedding vector that is nearest to the speaker vector.

3. The system of claim 1, wherein generating the speaker vector comprises:
　applying mean pooling over the encoder vectors to generate the single vector.

4. The system of claim 1, wherein the input audio data is a portion of an utterance, wherein the input audio data is preceded in the utterance by one or more other portions, and wherein generating the speaker vector comprises:
　applying mean pooling over the encoder vectors for the input audio data and encoder vectors generated for the one or more other portions of the utterance to generate the single vector.

5. The system of claim 1, wherein the encoder neural network is a convolutional neural network.

6. The system of claim 5, wherein the encoder neural network has a dilated convolutional architecture.

7. The system of claim 1, wherein the instructions further cause the one or more computers to implement:
　the decoder neural network, wherein the decoder neural network is configured to:
　　receive a decoder input derived from the discrete latent representation of the input audio data, and
　　process the decoder input to generate a reconstruction of the input audio data, and wherein the subsystem is further configured to:
　　generate the decoder input, wherein the decoder input comprises, (i) for each of the latent variables, the content latent embedding vector that is nearest to the encoded vector for the latent variable in the encoder output and (ii) the speaker latent embedding vector that is nearest to the speaker vector, and
　　provide the decoder input as input to the decoder neural network to obtain the reconstruction of the input audio data.

8. The system of claim 7, wherein the decoder neural network is an auto-regressive convolutional neural network that is configured to auto-regressively generate the reconstruction conditioned on the decoder input.

9. The system of claim 7, wherein the reconstruction of the audio input data is a predicted companded and quantized representation of the audio input data.

10. A method of training an encoder neural network having a plurality of encoder network parameters and a decoder neural network having a plurality of decoder network parameters and of updating a set of content latent embedding vectors and a set of speaker latent embedding vectors, the method comprising:
　receiving a training audio input;
　processing the training audio input through the encoder neural network in accordance with current values of the encoder network parameters of the encoder neural network to generate a training encoder output that comprises a plurality of training encoded vectors, each training encoded vector corresponding to a different latent variable in a sequence of a plurality of for latent variables;
　selecting, for each latent variable and from a plurality of current content latent embedding vectors currently stored in the memory, a current latent embedding vector that is nearest to the training encoded vector for the latent variable;
　generating a training speaker vector by combining at least the plurality of training encoded vectors in the training encoder output into a single vector; and
　selecting, from a plurality of current speaker latent embedding vectors currently stored in the memory, a current speaker latent embedding vector that is nearest to the training speaker vector that is generated by combining at least the plurality of training encoded vectors in the training encoder output generated by the encoder neural network into a single vector;
　generating a training decoder input that includes the nearest current content latent embedding vectors and the nearest current speaker latent embedding vector;
　processing the training decoder input through the decoder neural network in accordance with current values of the decoder network parameters of the decoder neural network to generate a training reconstruction of the training audio input;

determining a reconstruction update to the current values of the decoder network parameters and the encoder network parameters by determining a gradient with respect to the current values of the decoder network parameters and the encoder network parameters to optimize a reconstruction error between the training reconstruction and the training audio input; and updating the current content latent embedding vectors and the current speaker latent embedding vectors based on the training speaker vector and the plurality of training encoded vectors in the training encoder output.

11. The method of claim 10, wherein updating the current content latent embedding vectors and the current speaker latent embedding vectors comprises:

for each latent variable, determining an update to the nearest current content latent embedding vector for the latent variable by determining a gradient with respect to the nearest current latent embedding vector to minimize an error between the training encoded vector for the latent variable and the nearest current content latent embedding vector to the training encoded vector for the latent variable.

12. The method of claim 10, wherein updating the current content latent embedding vectors and the current speaker latent embedding vectors comprises:

determining an update to the nearest current speaker latent embedding vector for the latent variable by determining a gradient with respect to the nearest current speaker latent embedding vector to minimize an error between the training speaker vector and the nearest current speaker latent embedding vector.

13. The method of claim 10, further comprising:

for each latent variable, determining a respective commitment update to the current values of the encoder parameters by determining a gradient with respect to the current values of the encoder parameters to minimize a commitment loss between the training encoded vector for the latent variable and the nearest current content latent embedding vector to the training encoded vector for the latent variable.

14. The method of claim 10, wherein determining the gradient with respect to the current values of the encoder network parameters comprises:

copying gradients from the decoder input to the encoder output without updating the current speaker latent embedding vectors or current content latent embedding vectors.

15. The method of claim 10, wherein determining the gradient with respect to the current values of the encoder network parameters comprises:

determining a subgradient through the operations of selecting the nearest current latent embedding vector; and using the subgradient to determine the gradient with respect to the current values of the encoder network parameters.

16. The method of claim 10, further comprising:

processing the training decoder input through a pitch reconstruction neural network in accordance with current values of pitch reconstruction network parameters of the pitch reconstruction neural network to generate a training reconstruction of a pitch track of the training audio input; and determining a pitch reconstruction update to the current values of the pitch reconstruction network parameters and the encoder network parameters by determining a gradient with respect to the current values of the pitch reconstruction network parameters and the encoder network parameters to optimize a reconstruction error between the training reconstruction of the pitch track and a ground truth pitch track of the training audio input.

17. The method of claim 16, wherein the pitch reconstruction neural network is an auto-regressive convolutional neural network that is configured to auto-regressively generate the training reconstruction of the pitch track conditioned on the decoder input.

18. The method of claim 16, wherein determining the gradient with respect to the current values of the encoder network parameters to optimize a reconstruction error between the training reconstruction of the pitch track and a ground truth pitch track of the training audio input comprises:

copying gradients from the reconstruction network input to the encoder output without updating the current speaker latent embedding vectors or current content latent embedding vectors.

19. The method of claim 16, wherein determining the gradient with respect to the current values of the encoder network parameters to optimize a reconstruction error between the training reconstruction of the pitch track and a ground truth pitch track of the training audio input comprises:

determining a subgradient through the operations of selecting the nearest current latent embedding vector; and using the subgradient to determine the gradient with respect to the current values of the encoder network parameters.

20. A method comprising:

receiving input audio data;

providing the input audio data as input to an encoder neural network wherein the encoder neural network is configured to:

receive the input audio data; and process the input audio data to generate an encoder output that comprises a plurality of encoded vectors, each respective encoded vector of the plurality of encoded vectors corresponding to a respective different latent variable in a sequence of a plurality of latent variables; and generating a discrete latent representation of the input audio data from the encoder output, comprising:

for each of the latent variables in the sequence of latent variables, determining, from the set of content latent embedding vectors in the memory, a content latent embedding vector that is nearest to the encoded vector corresponding to the latent variable;

generating a speaker vector by combining at least the plurality of encoded vectors in the encoder output generated by the encoder neural network into a single vector; and determining, from the set of speaker latent embedding vectors in the memory, a speaker latent embedding vector from the set of speaker latent embedding vectors stored in the memory that is nearest to the speaker vector that is generated by combining at least the plurality of encoded vectors in the encoder output generated by the encoder neural network into a single vector, wherein:

the content latent embedding vectors in the set of content latent embedding vectors are learned during joint training of the encoder neural network and a decoder neural network; and the speaker latent embedding vectors in the set of speaker latent embedding vectors are learned during the joint training of the encoder neural network and the decoder neural network.

* * * * *